Figure 1:
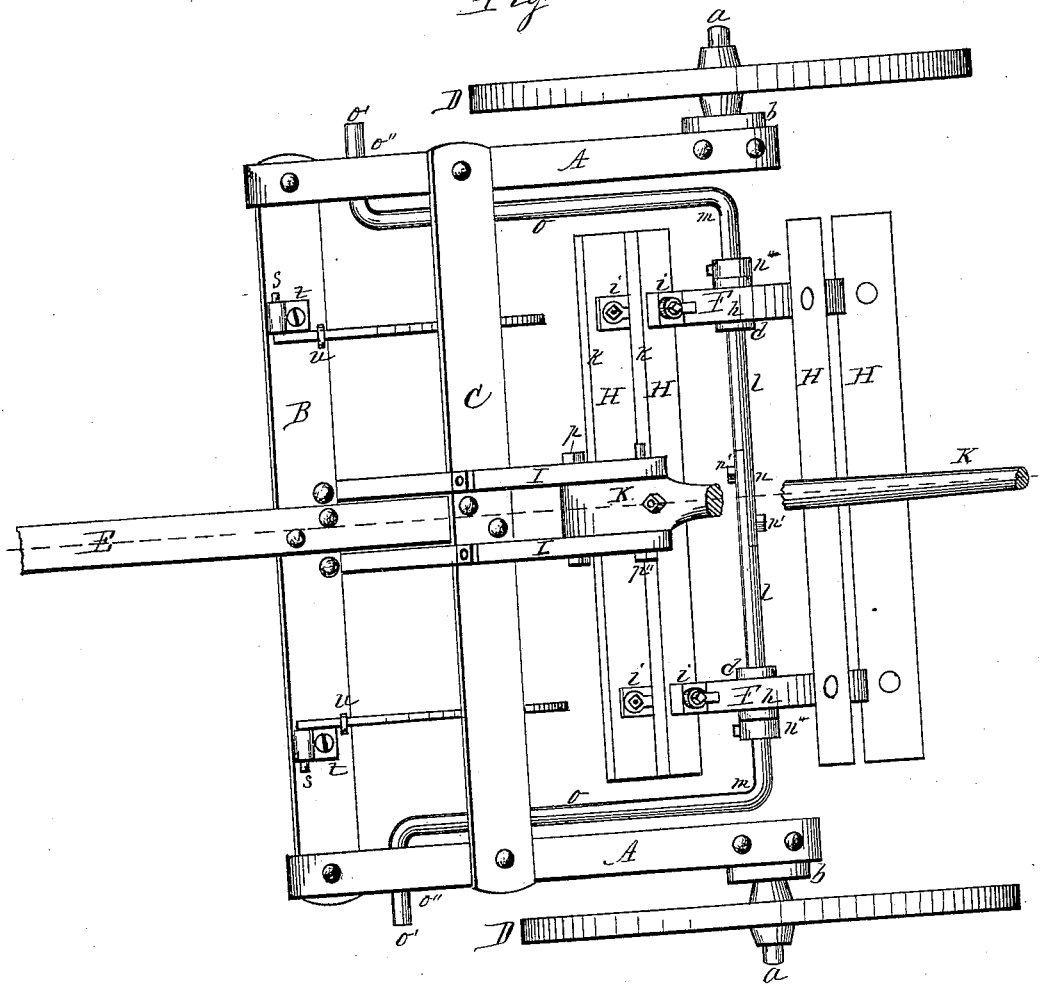

(No Model.)

R. FALCONER.
STALK CUTTING MACHINE.

No. 267,509. Patented Nov. 14, 1882.

2 Sheets—Sheet 1.

Witnesses,
A. O. Behel
M. C. Bardin.

Inventor.
Robert Falconer
Per Jacob Behel.
Atty.

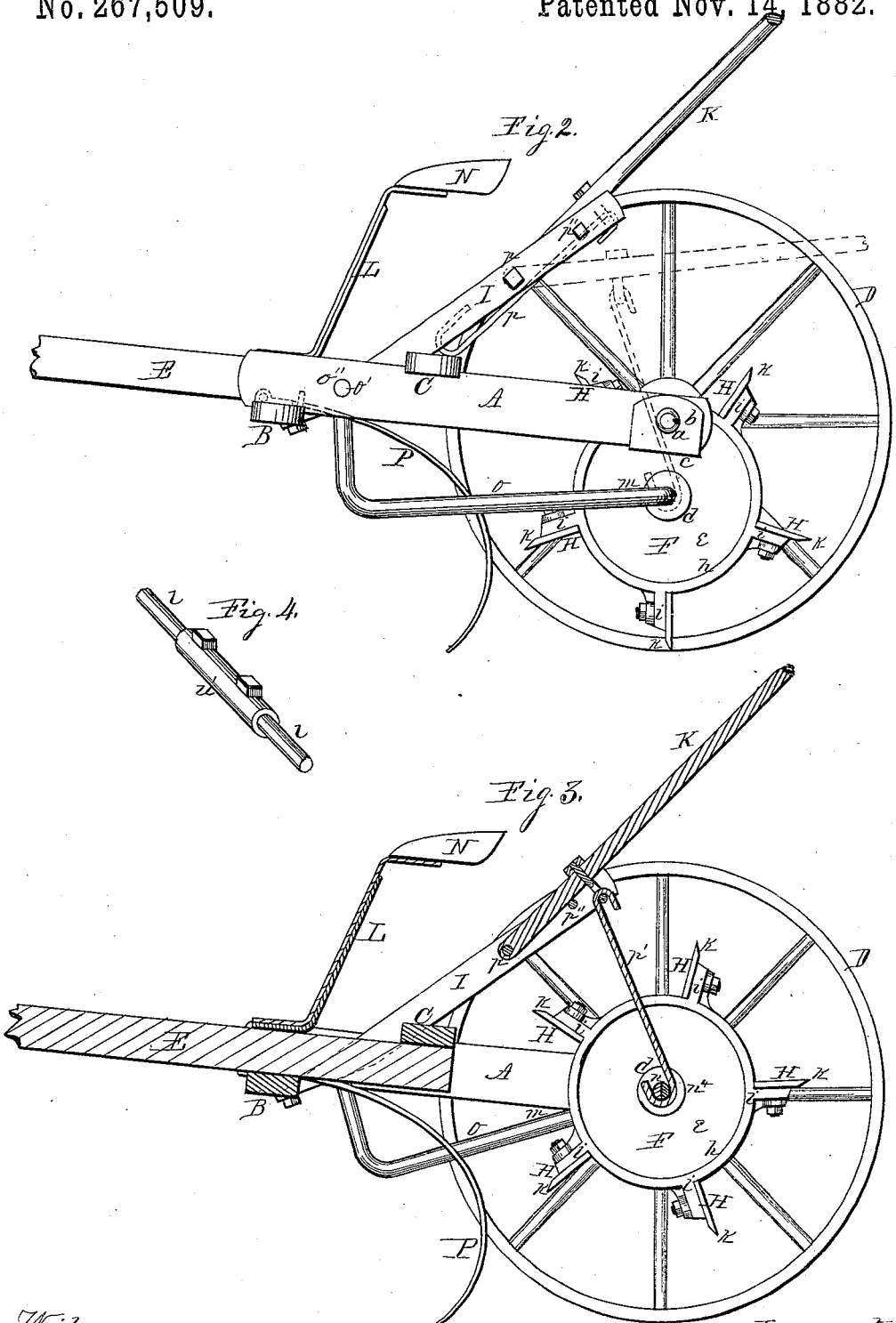

UNITED STATES PATENT OFFICE.

ROBERT FALCONER, OF ROCKFORD, ILLINOIS.

STALK-CUTTING MACHINE.

SPECIFICATION forming part of Letters Patent No. 267,509, dated November 14, 1882.

Application filed January 21, 1882. (No model.)

*To all whom it may concern:*

Be it known that I, ROBERT FALCONER, a citizen of the United States, residing in the town of Rockford, in the county of Winnebago and State of Illinois, have invented new and useful Improvements in Stalk-Cutting Machines, of which the following is a specification.

This invention relates to machines employed mainly in cutting the stalks remaining on the land on which corn has been grown after the corn crop has been gathered.

The object of this invention is to produce a machine at a small cost capable of reducing to small sections the stalks remaining on the ground after the corn crop has been gathered, to fit it for cultivation for the crop of the succeeding season.

To this end I have designed and constructed the machine represented in the accompanying drawings, in which—

Figure 1 is a plan view of a stalk-cutter embodying my invention. Fig. 2 is a side elevation with one of the carrying-wheels omitted. Fig. 3 is a lengthwise central vertical section, and Fig. 4 shows a method of connecting the central portion of the axle.

In the several figures, A represents side beams of suitable dimensions, rectangular in cross-section, and of a proper length to produce a suitable frame.

At B is represented a transverse beam of proper dimensions, rectangular in cross-section, and of proper length, having its end portions securely fixed to the under side of the forward end portions of the side beams by means of sufficient screw-bolts.

At C is represented a transverse beam, in all its dimensions substantially the same as the transverse beam B, and its end portions are fixed to the upper side of the lengthwise side beams, A, at a proper distance from their forward ends, by means of suitable screw-bolts.

At $a$ are represented axle-arms, fitted to receive carrying-wheels mounted to revolve thereon. These axle-arms project centrally at right angles to a vertical plate, $b$, fitted to engage the vertical outer face of the rear end of the side beams. These plates $b$ are provided at their lower edge with a horizontal plate, $c$, projecting inward at right angles to the vertical plates $b$, and are adapted to engage the under face of the rear end portion of the side beams, to which they are securely fixed by means of sufficient screw-bolts.

At D are represented carrying-wheels of ordinary construction, mounted upon the axle-arms $a$ in the usual manner, to revolve thereon.

At E is represented a tongue or pole, which is of the usual tapering form, and of a suitable size, having its rear end placed centrally in the frame, between the transverse beams thereof, to which it is securely fixed by means of screw-bolts of a suitable size. These parts constitute the supporting or carrying frame of my improved stalk-cutter.

At F are represented the heads of the cutter-reel, which are made of cast-iron, consisting of a hub, $d$, webbing $e$, and an outer rim, $h$, having radial arms $i$ projecting from its periphery. These radial arms $i$ have one of their sides produced on radial lines, and are fitted to receive the cutter-blades. These heads F are separated a suitable distance from each other, and receive the cutter-blades.

At H are represented cutter-blades which are of bar form, of proper thickness, width, and length, having one edge, $k$, beveled, producing a plane-bit cutting-edge, which is clearly represented in the drawings. These cutter-blades are fixed in position on the arms of the reel-heads by means of suitable screw-bolts, which are passed transversely through the blades and through the radial arms on the heads of the reel, producing a cutting-reel with blades having plane-bit cutting-edges. The hubs of the heads of this reel are centrally bored in the direction of the lengthwise axis of the reel to receive an axle in such a manner as to revolve thereon freely. This cutting-reel is mounted to revolve on the horizontal portion $l$ of a bail-formed axle, produced from bar material, in two sections, $m$, joined in its horizontal portion at $n$—in this instance by a suitable lap-joint produced by reducing the end portions of the two sections on opposite sides to their axial centers, and fixing their reduced portions to each other by means of suitable transverse bolts, $n'$, passed through the parts. By making the bail-formed axle in two parts and joining the same together, as above described, a ready means is provided for mounting the reel thereon. The position of the cutting-reel on the axle is fixed by means of suitable collars, $n^4$, welded onto the axle, or made adjustable thereon by means of suitable holding-screws, and the length of the paralled side arms is such as to carry or hold the axle of the cutting-reel in substantially the same vertical plane of the axles on which the carrying-wheels revolve.

At o are represented the lengthwise parallel arms of the bail-formed axle, which extend toward the forward end of the main frame, having their forward end portions, o', bent outward at a right angle to the lengthwise arms o. These angle-arms o' are supported in holes at o'' in the forward end portion of the side beams, A, of the main frame, producing a pivotal connection therewith to permit of a vertical movement of the cutting-reel supported on the horizontal portion of the bail-formed axle.

At I are represented two like beams to support the lifting-lever, placed one on each side of the tongue, having their forward ends placed in suitable gains on the rear under corner of the forward transverse beam of the main frame, and their rear under edge in suitable gains in the upper forward edge of the rear transverse beam. These like beams are fixed in their position to the transverse beams by means of suitable bolts passed through the parts.

At K is represented a lifting hand-lever, having its forward end pivoted between the like inclined beams I on a suitable pivot-bolt, p, passed transversely through the parts.

At p' is represented a hook-link, having a pivotal connection with the lifting hand-lever rearward of its pivotal support. The lower free end of this link p' is produced in hook form, adapted to engage the central portion of the reel-supporting axle, and is employed, in connection with the hand-lever, for the purpose of lifting the cutting-reel and holding it suspended for the purpose of transportation, which is accomplished by engaging the hook with the axle of the reel, as shown in dotted lines, Fig. 2, and then raising the free end of the lever and inserting a suitable bolt, p'', through the like bars I, below the lever, when in its raised position, as in Fig. 3. In lowering the cutting-reel to its operating position the free end of the hand-lever is raised sufficiently to permit the supporting-bolt p'' to be withdrawn, after which the lever is lowered and the hook-link disengaged from the axle, after which the lever is again raised, the hook-link placed in the position shown in the full and dotted lines, Fig. 2, and the supporting-pin again inserted in its position below the lever.

At L is represented a spring-seat support of the usual form, composed of suitable spring-steel bars having their bent foot-support securely bolted to the rear end portion of the tongue and their upper end suitably bent to receive the seat.

At N is represented the driver's seat, which is of the usual form, mounted on the upper bent end portion of the spring-support, to which it is securely bolted.

At P are represented drag-teeth, of the curved form represented, constructed from any suitable material, preferably of spring-steel, and their forward upper ends are provided with a lateral or horizontal arm, s, projecting at right angles to the lengthwise direction of the tooth.

At t are represented bearings of eye form, fitted to receive the lateral arms s of the teeth in a free manner. These bearings are fixed in position to the forward edge of the upper face of the forward transverse beam of the frame, and in such position thereon as to allow the teeth to trail between the corn-rows.

At u are represented staple-formed guides, which are fixed in the rear edge of the upper surface of the forward transverse bar in position to receive the curved tooth to permit a limited vertical movement of the tooth in the staple-formed guide to permit the tooth to pass obstructions. These teeth are employed to engage the stalks in advance of the cutting-reel and to trail them to lie lengthwise in the direction of the movement of the machine, that the blades of the cutting-reel may strike them in such a manner as to cut them in sections.

At Fig. 4 I have represented a means of connecting the end portions of the two-part axle of the cutting-reel in its horizontal portion by means of a sleeve, w', of a suitable bore to receive the end portions of the axle, to which it is fixed by means of suitable holding-screws.

By means of the foregoing-described construction I produce a machine having the cutting-reel in substantially the same vertical plane of the axles of the carrying-wheels of the supporting-frame, which produces a balanced machine to relieve the team from downward pressure on their necks, except what is produced by the driver mounted in his seat, which is but sufficient to steady the machine in its movements.

By the employment of the bail-formed axle of the cutting-reel I produce a machine in which the cutting-reel will be carried substantially parallel to the plane in which the supporting-wheels travel, and will prevent the dipping of the ends of the cutting-reel when riding on the ridge of the corn-rows.

I claim as my invention—

1. The combination, with the main frame, of the bail-formed axle, having its bent ends pivoted in front of the carrying-wheels of the frame and its central portion supporting the cutting-reel in or near the vertical plane of the axial supports of said carrying-wheels, substantially as described.

2. The combination, with the main frame and the bail-formed axle, constructed substantially as described, of the cutting-reel supported on the central portion of said axle and secured in place by the adjustable collars, as set forth.

3. In a stalk-cutting machine, a two-part bail-formed axle, connected together substantially as described, and adapted to support the cutting-reel upon its crank portion, substantially in the manner and for the purpose set forth.

4. A two-part bail-formed axle, connected together substantially as described, having a pivotal connection with the main frame at its forward ends and adapted to support the cutting-reel on the crank portion, substantially as and for the purpose set forth.

5. The combination, with the supporting-frame and with the cutting-reel, of a bail-formed axle having a cutting-reel supported and adapted to revolve on its central horizontal portion, and its forward ends having a pivotal connection with the main frame, substantially as and for the purpose hereinbefore set forth.

6. The combination, with a cutting-reel and with the main frame of a stalk-cutting machine, of a two-part bail-formed axle supporting a cutting-reel adapted to revolve on its central portion, and its forward end portions having a pivotal connection with the main frame to support the cutting-reel in or near the vertical plane of the carrying-wheels, substantially as and for the purpose hereinbefore set forth.

ROBERT FALCONER.

Witnesses:
A. O. BEHEL,
JACOB BEHEL.